(12) United States Patent
Chundrik, Jr. et al.

(10) Patent No.: US 8,849,495 B2
(45) Date of Patent: Sep. 30, 2014

(54) VEHICLE VISION SYSTEM WITH YAW RATE DETERMINATION

(71) Applicant: Magna Electronics, Inc., Auburn Hills, MI (US)

(72) Inventors: William J. Chundrik, Jr., Rochester Hills, MI (US); Nathaniel Johnson, Royal Oak, MI (US); Marc Wimmershoff, Aachen (DE)

(73) Assignee: Magna Electronics Inc., Holland, MI (US)

( * ) Notice: Subject to any disclaimer, the term of this patent is extended or adjusted under 35 U.S.C. 154(b) by 0 days.

(21) Appl. No.: 14/246,495

(22) Filed: Apr. 7, 2014

(65) Prior Publication Data

US 2014/0222286 A1 Aug. 7, 2014

Related U.S. Application Data

(63) Continuation of application No. 13/779,881, filed on Feb. 28, 2013, now Pat. No. 8,694,224.

(60) Provisional application No. 61/605,516, filed on Mar. 1, 2012.

(51) Int. Cl.

| *G06F 7/00* | (2006.01) |
|---|---|
| *B60W 50/00* | (2006.01) |
| *G01J 5/02* | (2006.01) |
| *G01J 5/34* | (2006.01) |
| *B60T 7/22* | (2006.01) |
| *G01J 5/00* | (2006.01) |

(52) U.S. Cl.
CPC ............ *B60W 50/0098* (2013.01); *G01J 5/024* (2013.01); *G01J 5/34* (2013.01); *B60T 7/22* (2013.01); *B60W 2520/10* (2013.01); *G01J 2005/0077* (2013.01)
USPC ......... 701/29.1; 701/41; 701/301; 250/338.3; 257/467; 340/425.5

(58) Field of Classification Search
CPC ..... G01J 5/34; G01J 5/024; G01J 2005/0077; B60T 7/22; B60W 2520/10
USPC ......... 701/29.1, 41, 301; 250/338.3; 257/467; 340/425.5
See application file for complete search history.

(56) References Cited

U.S. PATENT DOCUMENTS

| 4,720,790 A | 1/1988 | Miki et al. |
|---|---|---|
| 4,987,357 A | 1/1991 | Masaki |
| 4,991,054 A | 2/1991 | Walters |
| 5,001,558 A | 3/1991 | Burley et al. |

(Continued)

*Primary Examiner* — Mcdieunel Marc
(74) *Attorney, Agent, or Firm* — Gardner, Linn, Burkhart & Flory, LLP

(57) ABSTRACT

A vision system for a vehicle includes a camera disposed at or proximate to an in-cabin portion of a windshield of the vehicle. The camera has a forward field of view to the exterior of the vehicle through the windshield of the vehicle. The camera is operable to capture image data. A control includes an image processor that is operable to process captured image data to determine lane delimiters present in the field of view of the camera. The control connects to a vehicle communication bus of the vehicle and receives vehicle data via the vehicle communication bus. Responsive at least in part to processing of captured image data by the image processor and to vehicle data received via the vehicle communication bus, the control determines a yaw rate. The control provides the determined yaw rate to a driver assistance system of the vehicle.

20 Claims, 6 Drawing Sheets

(56) References Cited

U.S. PATENT DOCUMENTS

| | | |
|---|---|---|
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,151,816 A | 9/1992 | Varaprasad et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins et al. |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,929,786 A | 7/1999 | Schofield et al. |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |

(56) References Cited

U.S. PATENT DOCUMENTS

| | | |
|---|---|---|
| 6,049,171 A | 4/2000 | Stam et al. |
| 6,066,933 A | 5/2000 | Ponziana |
| 6,084,519 A | 7/2000 | Coulling et al. |
| 6,097,023 A | 8/2000 | Schofield et al. |
| 6,097,024 A | 8/2000 | Stam et al. |
| 6,144,022 A | 11/2000 | Tenenbaum et al. |
| 6,175,300 B1 | 1/2001 | Kendrick |
| 6,178,034 B1 | 1/2001 | Allemand et al. |
| 6,198,409 B1 | 3/2001 | Schofield et al. |
| 6,222,447 B1 | 4/2001 | Schofield et al. |
| 6,223,114 B1 | 4/2001 | Boros et al. |
| 6,227,689 B1 | 5/2001 | Miller |
| 6,250,148 B1 | 6/2001 | Lynam |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,317,057 B1 | 11/2001 | Lee |
| 6,320,176 B1 | 11/2001 | Schofield et al. |
| 6,320,282 B1 | 11/2001 | Caldwell |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,420,975 B1 | 7/2002 | DeLine et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,516,664 B2 | 2/2003 | Lynam |
| 6,523,964 B2 | 2/2003 | Schofield et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,370,983 B2 | 5/2008 | DeWind et al. |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,446,650 B2 | 11/2008 | Schofield et al. |
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,561,181 B2 | 7/2009 | Schofield et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,777,611 B2 | 8/2010 | Desai |
| 7,881,496 B2 | 2/2011 | Camilleri et al. |
| 7,914,187 B2 | 3/2011 | Higgins-Luthman et al. |
| 7,965,336 B2 | 6/2011 | Bingle et al. |
| 8,027,029 B2 | 9/2011 | Lu et al. |
| 8,058,977 B2 | 11/2011 | Lynam |
| 8,340,866 B2 * | 12/2012 | Hanzawa et al. ............... 701/41 |
| 8,694,224 B2 | 4/2014 | Chundrlik, Jr. et al. |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |

(56) References Cited

U.S. PATENT DOCUMENTS

| | | |
|---|---|---|
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2006/0290479 A1 * | 12/2006 | Akatsuka et al. ......... 340/425.5 |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2008/0180529 A1 | 7/2008 | Taylor et al. |
| 2009/0113509 A1 | 4/2009 | Tseng et al. |
| 2009/0177347 A1 * | 7/2009 | Breuer et al. ................... 701/29 |
| 2009/0243824 A1 | 10/2009 | Peterson et al. |
| 2009/0244361 A1 | 10/2009 | Gebauer et al. |
| 2009/0295181 A1 | 12/2009 | Lawlor et al. |
| 2010/0020170 A1 | 1/2010 | Higgins-Luthman et al. |
| 2010/0045797 A1 | 2/2010 | Schofield et al. |
| 2010/0097469 A1 | 4/2010 | Blank et al. |
| 2010/0228437 A1 * | 9/2010 | Hanzawa et al. ............... 701/41 |
| 2012/0062743 A1 | 3/2012 | Lynam et al. |
| 2012/0245817 A1 * | 9/2012 | Cooprider et al. ............. 701/70 |
| 2012/0303222 A1 * | 11/2012 | Cooprider et al. ............. 701/48 |
| 2013/0124052 A1 * | 5/2013 | Hahne ............................. 701/46 |
| 2013/0131918 A1 * | 5/2013 | Hahne ............................. 701/36 |
| 2013/0231825 A1 | 9/2013 | Chundrlik, Jr. |

* cited by examiner

VEHICLE VISION SYSTEM WITH YAW RATE DETERMINATION

CROSS REFERENCE TO RELATED APPLICATIONS

The present application is a continuation of U.S. patent application Ser. No. 13/779,881, filed Feb. 28, 2013, now U.S. Pat. No. 8,694,224, which claims the filing benefit of U.S. provisional application Ser. No. 61/605,516, filed Mar. 1, 2012, which is hereby incorporated herein by reference in its entirety.

FIELD OF THE INVENTION

This disclosure relates to vehicles, and more particularly to improving the accuracy of the determination of yaw rate in vehicles.

BACKGROUND OF THE INVENTION

Sensing yaw rate is important to land-based vehicles, and specifically, to road-going vehicles. Vehicle systems, such as collision avoidance systems, collision mitigation systems and stability control systems, may require accurate values of yaw rate to correctly determine the projected path of vehicle travel. Yaw rate sensors are susceptible to error, and if the measured yaw rate has significant error, then these kinds of vehicle systems may perform poorly or even fail. For example, significant error in the measured yaw rate could trigger a collision mitigation system to mistakenly determine that the vehicle is going to collide with another vehicle and could invoke emergency braking of the vehicle. Such braking could be dangerous if other vehicles are close behind and emergency braking is not warranted. Perhaps even worse, the system may mistakenly determine that the vehicle is not about to be in a collision and the system does not take action to prevent an otherwise avoidable collision.

SUMMARY OF THE INVENTION

A yaw rate offset is used to correct measured yaw rate error. In some embodiments, the yaw rate offset may be updated when the vehicle is stationary. The vehicle may be determined to be stationary by referencing at least two sensors. The first sensor provides an indication that the vehicle speed is zero. In embodiments, wherein the first sensor is a speed sensor, it can be insensitive to movement at low speeds, such as when pulling out of a parking space. Thus, the acceleration or derivative of acceleration (commonly referred to as "jerk") obtained from the second sensor, which is sensitive to slight movements, is also used to more confidently determine that the vehicle is stationary. In some embodiments, the yaw rate offset may be updated when the vehicle is moving straight. A camera that captures images of or image data representative of the road the vehicle is driving on may be used to determine that the vehicle is moving straight. Lane delimiters may be detected in the camera images with the goal of determining whether the vehicle is moving parallel to the lane delimiters. In a preferred embodiment, the yaw rate offset is updated both at times when the vehicle is stationary and at times when the vehicle is moving straight. In some embodiments, the yaw rate offset may be updated by combining a new yaw rate offset with a previous yaw rate offset according to a ratio. The ratio may be based on a level of confidence that the vehicle is indeed in an operating condition suitable for updating the yaw rate offset.

In a particular embodiment, the present invention is directed to a method for determining a yaw rate for a road-based vehicle having a yaw rate sensor, the method comprising:

(a) capturing images or image data representative of the environment outside the vehicle;

(b) determining if the vehicle is moving and has a zero yaw rate at least based on the images, such as based at least in part on image processing of image data captured by a camera;

(c) obtaining a first measured yaw rate from the yaw rate sensor when the vehicle is determined in step (b) to be moving and to have a zero yaw rate;

(d) determining a yaw rate offset based at least in part on the measured yaw rate obtained in step (c);

(e) obtaining a second measured yaw rate from the yaw rate sensor; and (f) determining a corrected yaw rate for the vehicle based on the second measured yaw rate and the yaw rate offset.

In another embodiment, the present invention is directed to a system for determining a corrected yaw rate for a yaw rate sensor on a land-based vehicle. The system includes a camera configured to be mounted to the vehicle, and a control system connected to the yaw rate sensor and the camera, the control system is operable to carry out the method described above.

In another embodiment, the present invention is directed to a method for determining a yaw rate for a road-based vehicle having a yaw rate sensor, the method comprising:

(a) obtaining an acceleration from an accelerometer positioned to sense a longitudinal acceleration of the vehicle;

(b) determining a rate of change of the acceleration;

(c) determining the vehicle speed;

(d) carrying out a determination of a yaw rate offset based at least in part on a first measured yaw rate from the yaw rate sensor, at least in part depending on whether the rate of change of the acceleration determined in step (b) is approximately zero, and at least in part depending on if the vehicle speed is zero;

(e) obtaining a second measured yaw rate from the yaw rate sensor; and (f) determining a corrected yaw rate for the vehicle based on the second measured yaw rate and the yaw rate offset.

In another embodiment, the present invention is directed to a system for determining a corrected yaw rate for a yaw rate sensor on a land-based vehicle. The system includes an accelerometer configured to or operable to sense a longitudinal acceleration of the vehicle, a speed sensor and a control system connected to all three sensors. The control system is configured to or operable to carry out the method described above.

In another embodiment, the present invention is directed to a method for determining a yaw rate for a road-based vehicle having a yaw rate sensor and at least one other sensor, the method comprising:

(a) determining whether the vehicle has a yaw rate of zero;

(b) obtaining a first measured yaw rate from the yaw rate sensor depending on the determination made in step (a);

(c) determining a yaw rate offset that is a first selected proportion of the first measured yaw rate obtained in step (b) and a second selected proportion of a previous yaw rate offset, wherein the first selected proportion and the second selected proportion are selected based on a set of criteria based on data determined from the at least one other sensor;

(d) obtaining a second measured yaw rate from the yaw rate sensor; and (e) determining a corrected yaw rate for the vehicle based on the second measured yaw rate and the yaw rate offset.

These and other objects, advantages, purposes and features of the present invention will become apparent upon review of the following specification in conjunction with the drawings.

BRIEF DESCRIPTION OF THE DRAWINGS

The drawings illustrate, by way of example only, embodiments of the present disclosure.

DETAILED DESCRIPTION OF THE INVENTION

Figure 1:
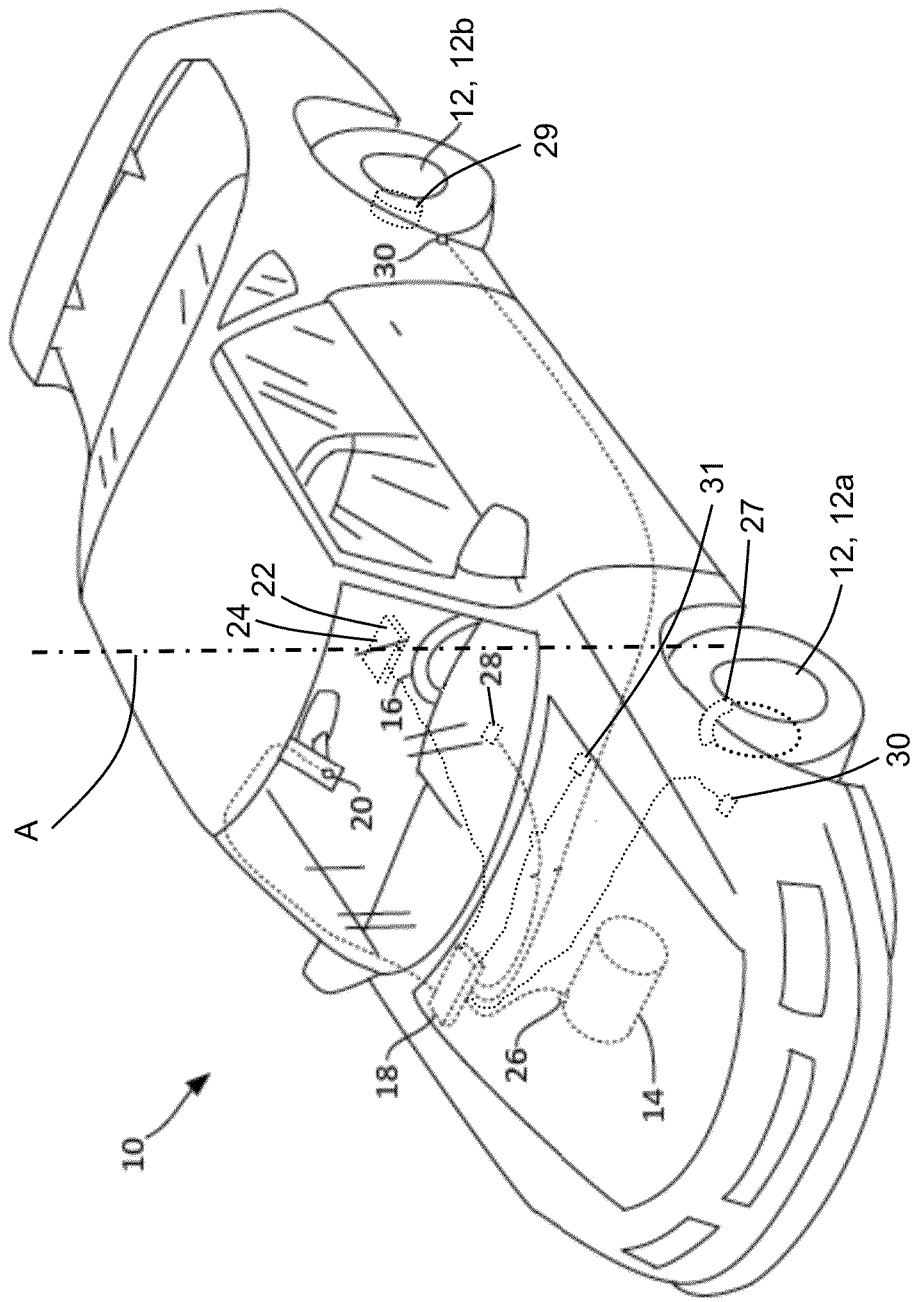
FIG. 1 is a perspective view of a land-based vehicle in accordance with an embodiment of the present invention.

Referring now to the drawings and the illustrative embodiments depicted therein, FIG. 1 illustrates a land-based vehicle 10 equipped with the system of the present invention. In this example, the vehicle 10 is a passenger car, but in other examples, the vehicle may be a truck, bus, van, motorcycle, or any other kind of vehicle. In the illustrated embodiment, the equipped vehicle 10 includes a body, a passenger area, wheels 12 (including front wheels 12a and rear wheels 12b), an internal combustion engine and/or an electric motor to drive the vehicle 10, a transmission 14 to convey power from the engine or motor to the wheels 12, a steering wheel 16 to turn the front wheels 12a, as well as other components for powering and controlling the vehicle 10. Clearly, the equipped vehicle may have other systems or components, such as, for example, steering of the rear wheels 12b or the like, without affecting the scope of the present invention.

As shown in FIG. 1, the vehicle 10 further includes a control system 18, a camera 20, a yaw rate sensor 22, a longitudinal accelerometer 24, a transmission sensor 26, a steering angle sensor 28, and a speed sensor 30. The camera 20, yaw rate sensor 22, longitudinal accelerometer 24, transmission sensor 26, steering angle sensor 28, and speed sensor 30 are each connected to the control system 18 to provide sensed information to the control system 18. Such connections may be by way of conductive wires or wireless signals. A bus, such as a Controller-Area Network (CAN) bus or a Local Interconnect Network (LIN) bus or the like, may be used for communication between the sensors and the control system 18.

The control system 18 controls aspects of the vehicle's operations. The control system 18 may comprise a single device or it may comprise a plurality of devices that communicate with one another. The control system 18 may comprise a separate device that is dedicated to carrying out the functions described below, or alternatively it may be partly or wholly contained within a unit that carries out other functions, such as the engine control unit (not shown) or vehicle control unit (not shown). The control system 18 will be discussed in further detail below with respect to FIG. 4.

The camera 20 is positioned to capture image data or images representative of the scene exterior of the vehicle 10 and encompassed by the field of view of the camera. In this example, the camera 20 is positioned in a forward-facing manner at the windshield of the vehicle 10. The camera 20 may be included as part of a rearview mirror assembly. In other examples, the camera 20 may be positioned elsewhere on the vehicle 10, such as at the front or rear bumpers. The camera 20 is operable to capture images of the road on which the vehicle 10 is travelling. The camera 20 may also be operable to capture images of other vehicles, road surface characteristics (such as, for example, lane markings or lane delimiters or the like), hazards on or near the road and other features of interest. The camera 20 may be provided with a camera control system (not shown) that processes images or image data captured by the camera. The camera 20 or the camera control system is connected to the control system 18 to output images and/or image information to the control system 18.

One or more of the camera control system and the control system 18 is capable of processing images captured by the camera 20 to detect lane markers or delimiters 32 (FIGS. 2a-c), such as painted lines or Botts' dots. Any suitable algorithm may be used to detect lane delimiters. For example, portions of the images may be scanned and processed for elements in a selected range of colors that are representative of the colors of typical roadway lane delimiters. Ambient lighting conditions may be taken into account. The color ranges being searched for may be adjusted depending on the time of day. In embodiments wherein the camera control system performs lane detection, the camera control system may output information indicative of characteristics of the lane delimiters, such as the number of detected lane delimiters, their positions and angles, a curvature of one or more lane delimiters, and/or a quality of a lane delimiter and/or the like, to the control system 18. Alternatively, the camera 20 may provide images to the control system 18, which performs lane detection on the images. Detection and assessment of lane delimiters will be discussed in further detail below.

The yaw rate sensor 22 is operable to sense the left and right yaw rate of the vehicle 10 (in other words, to sense the positive and negative angular rotational velocity of the vehicle about a local vertical axis A of the vehicle). Output of the yaw rate sensor 22 to the control system 18 may comprise a voltage within a range of voltages, such as about 0 to 5 volts, with about 2.5 volts being indicative of zero yaw rate, or a data message sent over a communications bus or network bus of the vehicle, such as a CAN bus or the like. The yaw rate sensor 22 may include any type of device, such as piezoelectric device, a micromechanical device, a microelectromechanical device, or similar. The longitudinal accelerometer 24 is operable to sense the longitudinal (forward or reverse) acceleration of the vehicle 10 and provide a signal indicative of a magnitude of such acceleration to the control system 18. The longitudinal accelerometer 24 may include any type of device, such as piezoelectric device, a micromechanical device, a microelectromechanical device, or similar. The longitudinal accelerometer 24 may be part of a multi-axis accelerometer.

The yaw rate sensor 22 and the longitudinal accelerometer 24 may be provided together in a sensor package that outputs aggregated data to the control system 18. Alternatively, the yaw rate sensor 22 and the longitudinal accelerometer 24 may be provided separately.

The transmission sensor 26 senses whether the vehicle transmission 14 is in park, in the case of an automatic transmission, or whether the transmission is disengaged, in the case of a manual transmission. The brake sensor 31 (FIG. 1) senses whether any brake system or systems of the vehicle are engaged. For greater clarity, 'a brake system' may be a main brake system 27 or a parking brake system 29. The transmission sensor 26 (alone in some cases such as in the case of an automatic transmission, and when combined with the brake sensor 31 in some cases such as in the case of a manual transmission) can thus provide to the control system 18 information indicative of whether the vehicle 10 is stationary or moving. The transmission sensor 26 may sense other gears as well, such as drive, reverse, first gear, and second gear, among others.

The steering angle sensor 28 communicates to the control system 18 information relating to the steering angle of the vehicle 10. In the embodiment shown, the steering angle sensor 28 senses a rotational position of the steering column (not shown), however the steering angle sensor 28 may be positioned anywhere suitable for sensing any suitable vehicle component related to the vehicle steering. The steering angle sensor 28 can provide to the control system 18 information indicative of whether the vehicle 10 is not turning, that is, whether the wheels 12 are positioned to move the vehicle 10 straight.

The speed sensor 30 is operable to sense a speed of the vehicle 10. The speed sensor 30 may be positioned at all of the wheels 12 of the vehicle 10. The speed sensor 30 provides to the control system 18 an indication of the vehicle's speed, and in some embodiments the speed sensor 30 may further provide an indication of the vehicle's direction of travel. For example, the speed sensors 30 may be used to determine, whether the vehicle is driving forward or in reverse. In another example, if there is a difference in the speeds recorded at left and right speed sensors 30 it is an indication that the vehicle is travelling in an arc.

Figure 2C:
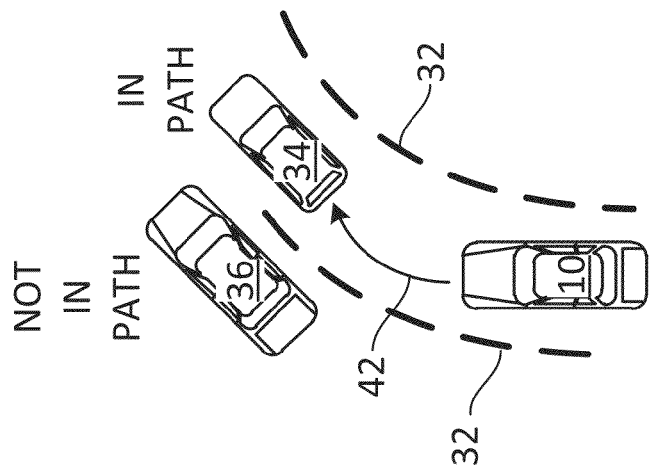
FIGS. 2a-c are diagrams showing projected paths of the vehicle.
Figure 2B:
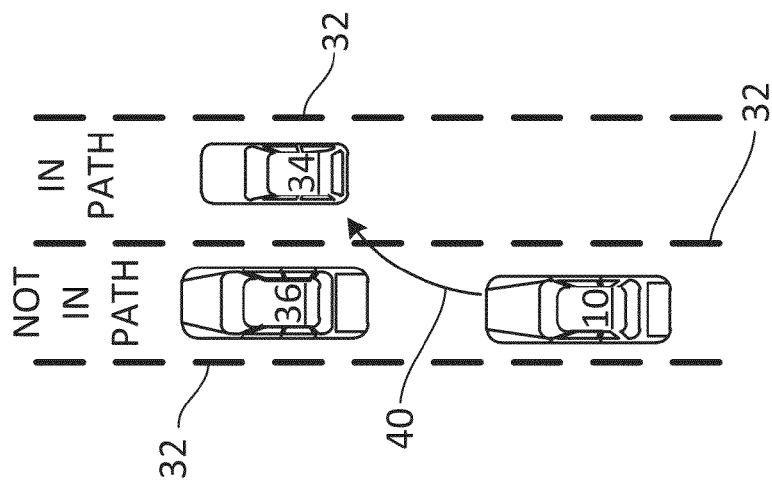
Figure 2A:
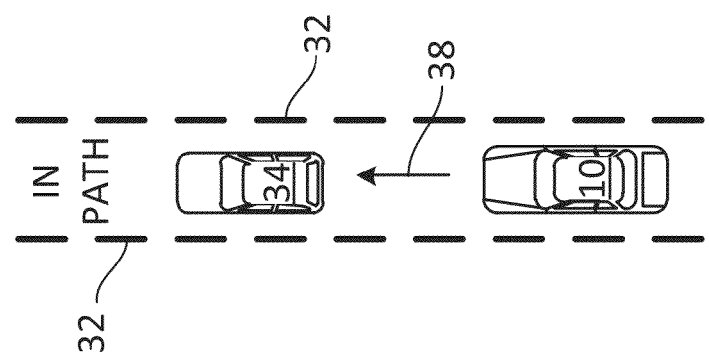

Referring to FIGS. 2a-c, the yaw rate sensor 22 may be used by the control system 18 to determine the projected path of the vehicle 10. Yaw rate may be expressed in any suitable units such as degrees per second or radians per second. Once the projected path of the vehicle is known (such as based in part on having an accurate determination of the yaw rate), the control system 18 can determine what other vehicles or obstacles on the road are in the projected path of the vehicle.

The control system 18 may operate on yaw rates stored in degrees per second, radians per second or any other units. However, the control system 18 may alternatively directly operate on yaw rates stored in other units, such as volts, binary values, or pulses, to name a few.

An example of the operation of the vehicle 10 using the yaw rate sensor 22 is shown in FIG. 2a. As shown, the vehicle 10 follows a second vehicle 34 in the same lane, as defined by lane delimiters 32. The yaw rate sensor 22 ideally outputs to the control system 18 a signal indicative of a yaw rate of about 0 degrees per second, and the control system 18 accordingly determines that the projected path 38 of the vehicle 10 is straight. Using an obstacle detection system that may, for example, include the camera 20 and/or a radar system (not shown), the control system 18 may detect the presence of the second vehicle 34. Using the yaw rate, the control system 18 can determine that the second vehicle 34 is in the projected path of the vehicle 10. If the control system 18 determines that there is a risk of collision between the vehicle 10 and the second vehicle 34 (such as a likelihood of collision that is at or above a threshold level of risk), the control system 18 can take an appropriate action, such as warning the driver of vehicle 10 via a visual and/or audible warning, and/or automatically applying the brakes of the vehicle 10.

Another example of the operation of the control system 18 is shown in FIG. 2b, in which the vehicle 10 is directly behind a third vehicle 36 in a left lane but has started a rightward lane change. Accordingly, the yaw rate sensor 22 ideally outputs to the control system 18 a signal indicative of a yaw rate of some value, such as about 0.5 degrees per second, and the control system 18 accordingly determines that the projected path, shown at 40, of the vehicle 10 is curved to the right. Consequently, the control system 18 then determines that the third vehicle 36 is not in the projected path 40 of the vehicle 10, but that the second vehicle 34 in the right lane is in the projected path of the vehicle 10, even though the second vehicle 34 is not directly in front of the vehicle 10.

Yet another example is shown in FIG. 2c, in which the vehicle 10 is travelling in a right lane of a curved road, and thus, the third vehicle 36, which is located ahead of the vehicle 10 in a left lane, may appear to be in the projected path of the vehicle 10. However, assuming the road has a radius of curvature of about 600 m (1970 ft) and the speed of the vehicle 10 is about 113 km/hr (70 mph), the yaw rate sensor 22 ideally outputs to the control system 18 a signal indicative of a yaw rate of about 3.0 degrees per second. Accordingly, the control system 18 determines that the projected path 42 of the vehicle 10 is curved to the right. Consequently, the control system 18 then determines that the third vehicle 36 is not in the projected path 42 of the vehicle 10, but that the second vehicle 34 in the right lane is in the projected path 42 of the vehicle 10.

Thus, it can be seen that yaw rate is a factor in predicting collisions. The vehicle 10 may use the yaw rate sensor 22 in a collision mitigation or avoidance system, of which the control system 18 may be a component. The vehicle 10 may additionally or alternatively use the yaw rate sensor 22 with an electronic stability control system, of which the control system 18 may be a component.

However, it should be noted that the examples of FIGS. 2a-c reference ideal yaw rate values. In practical applications, yaw rate sensors are susceptible to error. Error in the determined yaw rate can cause vehicle systems to incorrectly determine the projected path of the vehicle 10. As an example, when a prior art vehicle is driving straight, the error in the determined yaw rate can cause a control system in the prior art vehicle to determine that the projected path of the vehicle is curved. As another example, when a prior art vehicle is driving in an arc, that same error can cause a control system in the prior art vehicle to determine that the vehicle is driving straight. A relatively large magnitude error may be exhibited when the vehicle 10 is first turned on and can change with changing temperature after the vehicle 10 is started and as the vehicle 10 heats up to normal operating temperature. Such an error may be from about 0.5 degrees per second to more than about 7 degrees per second. A generally more gradual and sometimes smaller kind of error is known as drift error, which may also be attributable to temperature changes, and may also occur as the vehicle 10 is operated. Total yaw rate error may be greater than about 7 degrees per second.

Besides temperature, errors can also be caused by electromagnetic interference (EMI) and variation in sensor quality. Although a temperature sensor located at a yaw rate sensor could be used to compensate for errors due to temperature, this can greatly increase the cost of the sensor, since such sensors are typically instrumentation-grade and impractical to use for high production volumes. Known error compensation and filtering techniques may delay output of yaw rate to other systems, such as a stability control system, that may require low delays in yaw rate data. In addition, since multiple different systems of the vehicle 10 may require yaw rates according to different criteria (such as, for example, low delay, averaged, filtered), it may be advantageous to allow those systems to process yaw rates according to their specific criteria by providing to all such systems common yaw rates that have been filtered as little and as quickly as possible.

Figure 3:
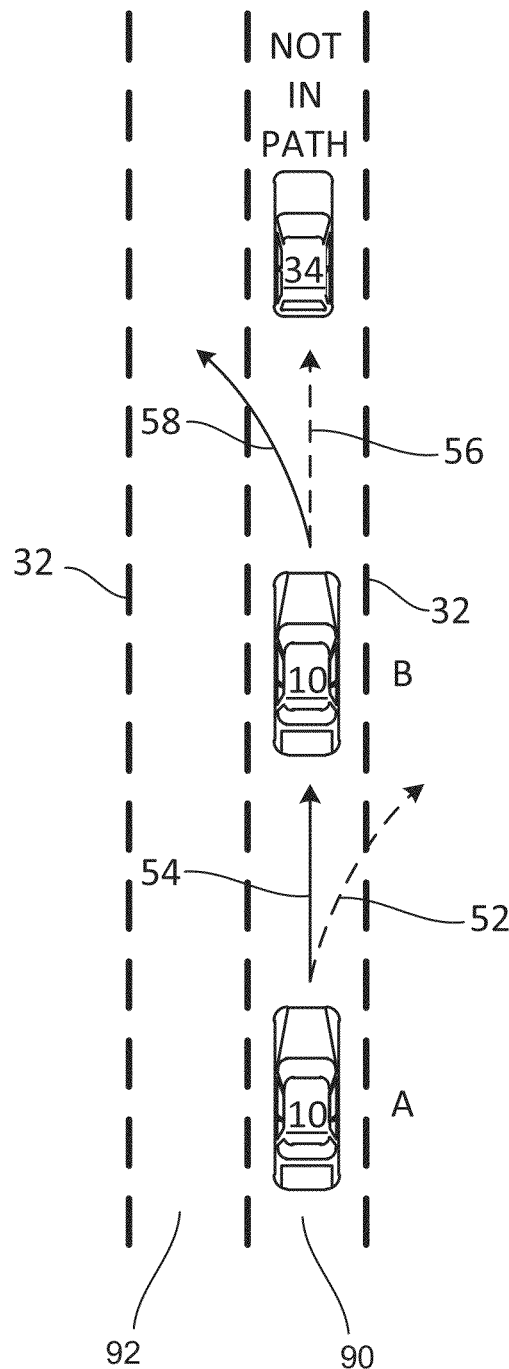
FIG. 3 is a diagram illustrating an example of yaw rate error.

FIG. 3 shows an example of the effect of yaw rate error. In this example, the vehicle 10 drives along a straight path in the right lane (shown at 90) from position A to position B, and then steers into the left lane (shown at 92) to avoid the second vehicle 34. In this example, the yaw rate sensor 22 of the vehicle 10 has an error of about +0.5 degrees per second, with positive yaw rate indicating a projected path that is rightward and a negative yaw rate indicating a projected path that is leftward. As noted above, the vehicle 10 travels straight in a right lane of a road from a position A to a position B, at which point it approaches a slower-moving or stationary second vehicle 34. When the vehicle 10 is at position A and is driving straight, if the control system 18 does not compensate for the error in the yaw rate sensor 22, it would determine that the yaw rate for the vehicle 10 is 0.5 degrees per second, which falsely indicates that the vehicle is turning to the right, as shown by projected path 52, as opposed to correctly indicating that the vehicle 10 is traveling along a straight path 54.

As a result, a collision mitigation system on board the vehicle 10 would not determine that the second vehicle 34 is in the projected path of the vehicle 10. As a result, it would not appropriately apply emergency braking or warn the driver of vehicle 10 in the event of an impending collision between the two vehicles 10 and 34. When the vehicle 10 reaches point B and steers into the left lane 92 (such as, for example, with an actual yaw rate of about −0.5 degrees/second) to avoid a collision with the second vehicle 34, the sensor error would cause the control system 18 to determine the vehicle's yaw rate to be about 0 degrees per second, which falsely indicates that the vehicle 10 is travelling straight, as shown by projected path 56, as opposed to correctly indicating that the vehicle 10 is turning left with a yaw rate of about −0.5 degrees per second, as indicated at 58.

Due to this error, a collision avoidance or mitigation system of the vehicle 10 may incorrectly apply emergency braking to prevent the apparent imminent collision with the second vehicle 34, which can be dangerous. Unfortunately, even if the control system 18 attempts to correct the error in the yaw rate signal from the yaw rate sensor 22 based on a fixed formula or a fixed lookup table (so as to compensate for error caused by ambient temperature), it is still not sufficient, since the amount of error in the yaw rate signal can drift for a variety of reasons. Accordingly, a control system 18 can still have significant error in the determined yaw rate for the vehicle 10 when employing such techniques to correct for error.

Techniques for correcting output of the yaw rate sensor 22 for error in accordance with an embodiment of the present invention will now be discussed.

Figure 4:
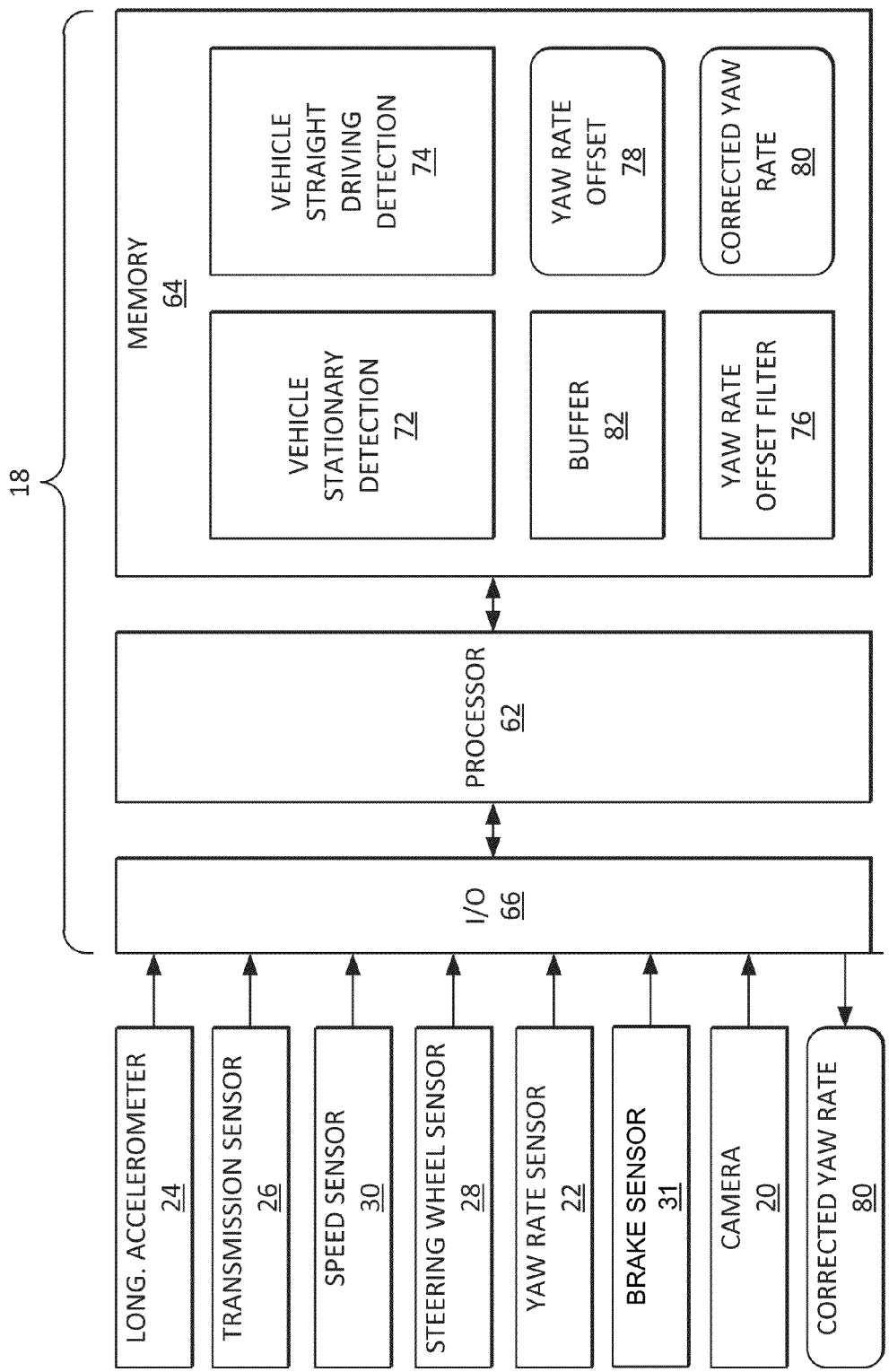
FIG. 4 is a functional block diagram of a control system, camera, and sensors that are part of the vehicle shown in FIG. 1.

FIG. 4 illustrates a functional block diagram of the control system 18, the camera 20, and the sensors 22-31. The control system 18 includes a processor 62, a memory 64 connected to the processor 62, and an input/output interface 66 connected to the processor 62. The sensors 22-31 are connected to the processor 62 via the input/output interface 66 to provide sensed information to the processor 62. The camera 20 may also be connected to the processor 62 in this way, or a camera control system of the camera 20 may be connected to the processor 62 via the input/output interface 66.

The input/output interface 66 can include a bus, such as a CAN bus. The input/output interface 66 can include one or more analog-to-digital converters to convert analog signals from any of the sensors 22-31 (in embodiments wherein any of them are analog devices) into digital signals usable by the processor 62.

The memory 64 stores a vehicle stationary detection routine 72, a vehicle straight driving detection routine 74, and a yaw rate offset filter routine 76. Such routines may be in the form of any programmatic entity such as a program, a routine, a subroutine, a function, a script, executable instructions, intermediate instructions that are executed to generate executable instructions, an object, and a class, to name a few. Any of the routines 72-76 can include lookup tables for obtaining lookup values using known values. The routines 72-76 may be provided as separate routines, as illustrated. Alternatively, two or more of the routines 72-76 may be provided together in a larger routine. In addition, any of the routines 72-76 may be separated into two or more smaller routines.

The memory 64 further stores a yaw rate offset 78 as a variable value that may be updated when appropriate. To determine a new yaw rate offset (such as to update the yaw rate offset 78), the processor 62 references the camera 20 and sensors 22-30, executes the routines 72-76 to act on the information obtained from the camera 20 and sensors 22-30, and further references the stored yaw rate offset 78.

As the processor 62 obtains one or more yaw rates from the yaw rate sensor 22, the one or more yaw rates may be stored in a buffer 82 in the memory 64. The processor 62 can reference the buffer 82 for a yaw rate required by the routines 72-76, and can ignore spurious yaw rates in the buffer 82 or apply an input filter to one or more of these yaw rates to reduce noise and obtain a filtered input yaw rate.

The processor 62 can further obtain a corrected yaw rate 80 by subtracting the yaw rate offset 78 from a measured yaw rate obtained from the yaw rate sensor 22. The corrected yaw rate 80 may be output to the memory 64 for storage for later use by the processor 62 in performing routines that require a corrected yaw rate, such as routines for collision mitigation or avoidance or stability control. The processor 62 may additionally or alternatively output the corrected yaw rate 80 to the input/output interface 66 for use by other systems of the vehicle 10.

The vehicle stationary detection routine 72 and the vehicle straight driving detection routine 74 are used determine when the vehicle 10 is in a condition where the actual yaw rate of the vehicle 10 is approximately zero, and therefore the signal sent from an ideal yaw rate sensor would indicate a yaw rate of zero. When the vehicle is in such a condition, it is conducive to determining the amount of error that exists in the real yaw rate sensor 22, and therefore is conducive to updating the yaw rate offset 78. In a simple embodiment, when the vehicle 10 is determined to be either stationary or moving in a straight path, the yaw rate offset 78 may simply be determined to be the measured yaw rate from the yaw rate sensor 22. It will be understood that, in some circumstances, it is at least theoretically possible for even the most sophisticated control system 18 to determine that the vehicle is stationary or is moving in a straight path, when the vehicle 10 is, in fact, not. If the yaw rate offset 78 were simply replaced with the measured yaw rate at that time, a potentially large error could inadvertently be introduced into the yaw rate offset 78. To reduce the potential for introducing a large error into the yaw rate offset 78, in some more complex embodiments, updating the yaw rate offset 78 entails:

(a) determining the vehicle 10 is either stationary or is moving in a straight path; and (b) if the vehicle is determined to be either stationary or moving in a straight path, adding a percentage of the value of the measured yaw rate with a percentage of the previously stored value yaw rate offset, to arrive at an updated value for the yaw rate offset Each of the routines 72-76 will now be discussed in detail. The vehicle stationary detection routine 72 references the longitudinal accelerometer 24 to determine whether the vehicle 10 is stationary. A longitudinal acceleration of the vehicle 10 may be obtained over a selected duration of time. A derivative or rate of change of the longitudinal acceleration can then be determined. The first derivative of acceleration is known as jerk. When the value of jerk is determined to indicate that the vehicle 10 is stationary, the vehicle stationary detection routine 72 can reference the yaw rate sensor 22 to obtain a measured yaw rate that is used for the updating of the yaw rate offset 78.

The value of jerk that would be indicative of a stationary vehicle would be a value that is approximately zero. The selected duration of time may be several seconds (such as, for example, about 0.5 seconds). However, it will be noted that when the vehicle 10 is under a constant acceleration, the value of jerk would also be approximately zero. Thus, the control system 18 does not rely on the value of jerk alone to determine when the vehicle 10 is stationary. The control system 18 also uses at least one other criterion to support a determination that the vehicle 10 is stationary. For example, another criterion may be that the vehicle speed (as measured by speed sensor 30) is measured to be approximately zero. An example of another criterion (in embodiments wherein the vehicle 10 is equipped with an automatic transmission) is whether the gear selector for the transmission is in 'Park', as determined by the transmission sensor 26. If the vehicle 10 is equipped with a manual transmission, the criterion could instead be whether the gear selector for the transmission is in 'Neutral', as determined by the transmission sensor 26 and whether the main brake system (such as the brake pedal of the vehicle) has been depressed beyond a selected amount for a selected period of time or whether the parking brake system has been depressed or actuated.

As a condition for referencing the longitudinal accelerometer 24 to determine the current value of jerk, the vehicle stationary detection routine 72 may first determine whether the vehicle speed obtained from the vehicle speed sensor 30 is approximately zero for a selected duration (such as, for example, about 0.5 seconds), and/or whether the gear selector is in 'Park' (for an automatic transmission) or whether the gear selector is in neutral (for a manual transmission) and the brake is sufficiently depressed for sufficiently long, thereby saving the processor 62 from having to determine jerk when the vehicle 10 is known by the control system 18 to not meet other criteria for being stationary.

Determining whether the vehicle 10 is stationary by using the value of jerk in addition to vehicle speed and/or the position of the gear selector is advantageous over a system that would determine whether the vehicle is stationary using only vehicle speed and/or gear selector position, without using the value of jerk. This is because there are situations in which the measured vehicle speed from the speed sensor 30 could be zero, even though the vehicle is moving. An example would be when the vehicle 10 is being carried on a ferry. It will be noted that when the vehicle 10 is being carried on a ferry, the gear selector for the transmission would also be in 'Park'. Thus, when the vehicle is on a ferry, a control system of the prior art could be fooled into determining that the vehicle is stationary even though it is not. However, the movements of the ferry during transport of the vehicle 10 could be sensed by the longitudinal accelerometer 24 and would result in a value of jerk that is non-zero. Thus, by basing the determination of whether the vehicle 10 is stationary on the value of jerk in addition to at least one other criterion such as vehicle speed and/or gear selector the control system 18 is inhibited from determining that the vehicle 10 is stationary in such a situation.

Using the value of jerk is advantageous over simply using the value of longitudinal acceleration itself, because there are situations in which the vehicle 10 is stationary but where the longitudinal acceleration sensor 24 would signal to the control system 18 that there is an acceleration on the vehicle, thereby misleading the control system 18 to determine that the vehicle 10 is not stationary. Such a situation would be, for example, when the vehicle 10 is stationary on a downhill slope or on an uphill slope. In such situations, the acceleration sensor 24 would sense the force of gravity urging the vehicle to roll down the slope. Thus, the sensor 24 would send signals to the control system 18 that are non-zero and which have a magnitude determined by the angle of the slope on which the vehicle 10 is positioned. As a result, the control system 18 could determine that the vehicle is under acceleration even though the vehicle may be stationary. However, the force of gravity is constant, and so value of jerk that would exist in such a situation would be approximately zero. Thus, by determining whether the vehicle 10 is stationary based on jerk instead of longitudinal acceleration, situations in which the vehicle 10 is stationary can be captured that might otherwise be missed.

As described above, examples of conditions that the vehicle stationary detection routine 72 can evaluate in order to determine whether the vehicle 10 is stationary include:

1. A value of jerk being less than a threshold value, preferably for at least a selected period of time,
2. A vehicle speed being less than a threshold speed, preferably for at least a selected period of time, and
3. The transmission 14 being determined to be in 'Park' (for automatic transmission) or in 'Neutral' with the brake depressed, preferably for at least a selected period of time (for manual transmission). The three aforementioned selected periods of time need not be the same as each other.

Figure 6:
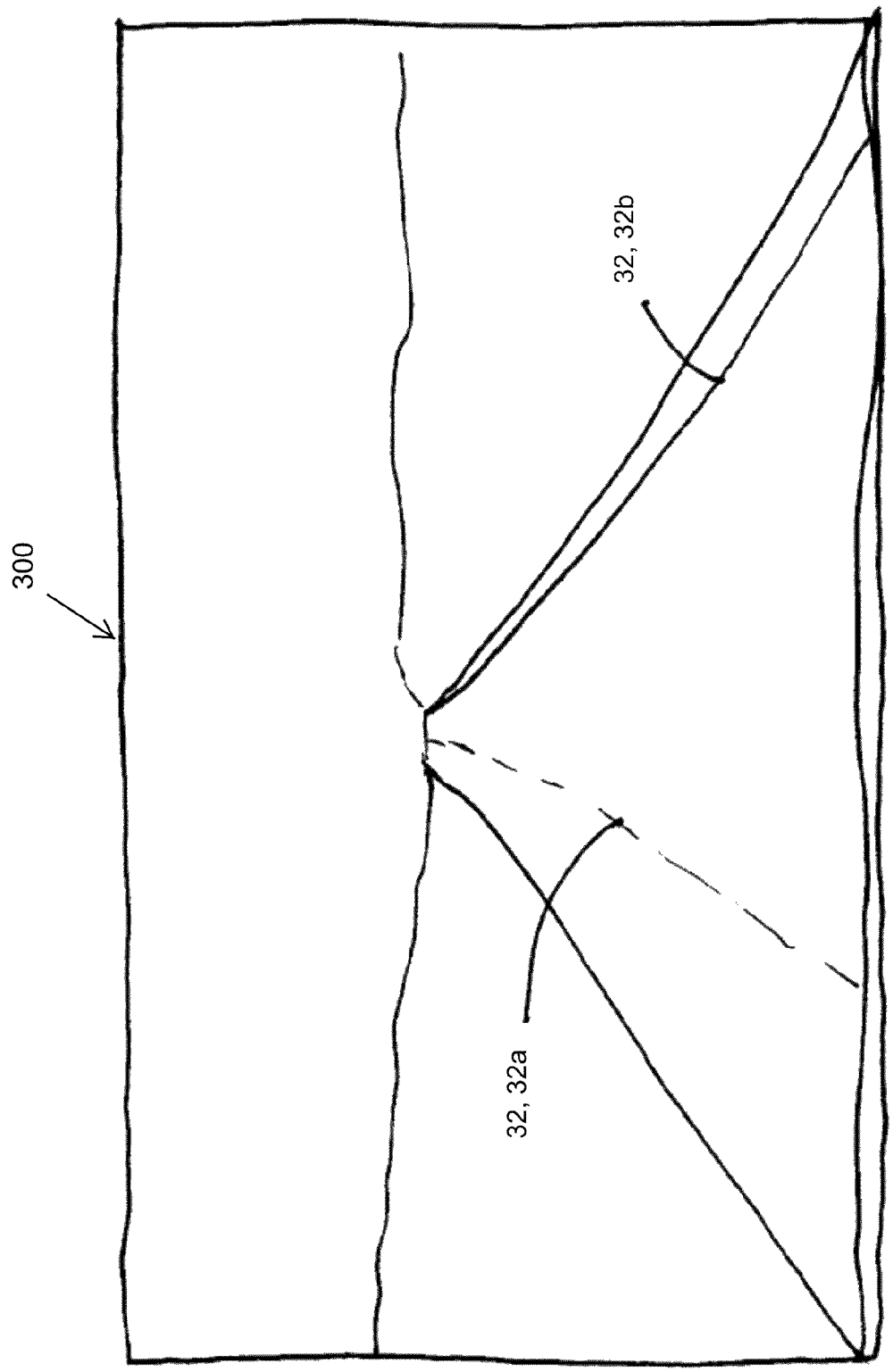
FIG. 6 is an example image from a camera at the vehicle shown in FIG. 1.

The vehicle straight driving detection routine 74 references the camera 20 (and one or more other sensors such as the steering angle sensor 28 and the speed sensor 30) to determine whether the vehicle 10 is driving straight (and therefore has an actual yaw rate of about zero) based on an analysis of images captured by the camera 20. In an embodiment, to determine whether the vehicle 10 is driving straight (such as driving in a straight path), the control system 18 detects any lane delimiters 32 present in the images. An example image is shown at 300 in FIG. 6. In this image, two lane delimiters shown at 32 (shown individually at 32a and 32b) are detected (one on either side of the vehicle 10). Optionally, the control system 18 may be programmed to continue to the next steps only with lane delimiters 32 that are detected for a continuous selected period of time, such as about 0.5 seconds or more or less.

In order for the control system 18 to determine whether or not a lane delimiter 32 has been detected, it may assess the 'quality' of the data obtained from the camera images, such as, for example, whether the control system 18 has received sufficient image information to accurately determine the position and curvature of the lane delimiter 32. When the quality of the data does not meet the threshold quality, then the control system 18 determines that the data does not relate to a lane delimiter 32. Evaluation of lane delimiter quality may be performed by the control system 18, for example as part of the vehicle straight driving detection routine 74, or by a camera control system or lane-keeping system.

After detecting any lane delimiters 32, the control system 18 may be programmed to determine whether the detected lane delimiters 32 are generally straight. Each lane delimiter 32 may be modeled using a polynomial equation, such as a third-order polynomial equation. A curvature of the lane delimiter 32 may be obtained by taking a derivative of the polynomial equation. Coefficients of the terms of the derivative equation may be tested for linearity. A relatively small coefficient for a non-linear term (such as, for example, $x^2$ or $x^3$), when compared to a linear coefficient (such as, for example, x), can indicate a lane delimiter 32 of low curvature. Lane curvature may be determined by the controller 18, for example as part of the vehicle straight driving detection routine 74, or for example, by a camera controller or lane-keeping system.

For any lane delimiters 32 that are determined to be straight, the controller 18 may be programmed to determine the heading of the vehicle 10 relative to each generally straight lane delimiter 32. Thus, if there is only one lane delimiter 32 detected, and it is determined to be generally straight, the controller 18 may be programmed to determine the heading of the vehicle 10 relative to that lane delimiter 32. If there are two generally straight lane delimiters 32 detected the controller 18 may be programmed to determine the heading of the vehicle 10 relative to the first lane delimiter (such as, for example, lane delimiter 32a in FIG. 6) and then to determine the heading of the vehicle relative to the second lane delimiter (such as, for example, lane delimiter 32b in FIG. 6).

The heading of the vehicle may be determined by the controller 18 by any suitable method. For example, it may be determined using one or more of the steering angle sensor 28, the yaw rate sensor 22 and by analysis of the images from the camera 20. For example, the images from the camera 20 may be analyzed by the controller 18 to determine if, over time, any detected lane delimiters 32 are moving by more than a selected amount along the x-axis in the images. Such movement would be indicative that the vehicle 10 is not precisely parallel to the lane delimiters 32. The amount of such movement could be correlated to a relative angle between the vehicle 10 heading and the direction of the lane delimiters 32.

When the control system 18 determines that the vehicle 10 is sufficiently parallel to (such as, for example, within a selected number of degrees of) one or more generally straight lane delimiters 32 for at least a threshold duration of time (such as, for example, about 0.1 seconds), the vehicle straight driving detection routine 74 may update the yaw rate offset 78. To update the yaw rate offset 78, the control system 18 may obtain a measured yaw rate from the yaw rate sensor 22. This measured yaw rate may, for example, be used by the control system 18 directly as the new yaw rate offset 78 and may simply replace the previous yaw rate offset. Alternatively (and preferably), the new yaw rate offset 78 may be some selected proportion or percentage of the measured yaw rate added to some selected proportion or percentage of the previous yaw rate offset, as described in more detail below.

In addition to using the images from the camera 20, data from other sensors may be used by the control system 18 to determine whether the vehicle 10 is driving in a straight path. For example, the control system 18 may receive signals from the steering angle sensor 28 to determine whether the steering angle of the vehicle 10 is less than a selected threshold steering angle (such as, for example, approximately zero). Also, the speed sensor 30 will be used to determine that the vehicle 10 is in fact, moving (such as, for example, moving above a selected threshold speed).

It is advantageous to be able to determine the error (which may be referred to as the offset) of the yaw rate sensor 22 while driving (not just when the vehicle is stationary), since drift error can increase the error in yaw rate over time, and it is not always practical to wait until the vehicle stops to determine the yaw rate offset 78, especially during a long drive.

Using the camera 20 to detect lane delimiters 32 that are straight and to determine whether the vehicle heading is parallel with the lane delimiters 32 has advantages over other approaches, such as by relying solely on steering angle. This is because it is possible in some situations for the steering angle not to reflect the true heading of the vehicle 10. For example, if the road has a crown as many roads do, the vehicle may steer by some small amount towards the peak in order to drive straight. Similarly in a crosswind a driver may steer the vehicle into the crosswind by some small amount in order to maintain a straight heading on the road. Therefore, relying on steering angle may mask situations of straight driving that could have been used to determine yaw rate offset 78.

Even though the aforementioned examples describe situations in which the steering angle is not zero when the vehicle 10 heading is straight, the control system 18 may still compare the measured steering angle (such as, for example, from steering angle sensor 28) with a threshold steering angle as a condition for determining whether the vehicle 10 has some chance to be travelling straight before going on to carry out the detection and operations relating to the camera images. For example, the control system 18 may determine that the vehicle 10 has at least some chance of following a straight path if the steering angle if the vehicle is less than, for example, about 10 degrees angularly to the left or to the right, preferably for at least a selected period of time (such as, for example, about 5 seconds). Additionally the control system 18 can determine whether or not the rate of change of the steering angle exceeds a threshold rate of change of the steering angle (such as, for example, about 2 degrees per second), before permitting the control system 18 to analyze the camera images 20 for lane delimiters 32. Alternatively, the analysis of images from the camera 20 may be carried out simultaneously with the determinations made above relating to steering angle and the rate of change of the steering angle.

Even in situations where there are no lane delimiters detected, the control system 18 may still update the yaw rate offset 78 if, for example, the steering angle is sufficiently low and if the vehicle is moving.

The conditions that the vehicle straight driving detection routine 74 can evaluate in order to determine whether the vehicle 10 is moving straight are summarized as follows:

1. Detection of any straight lane delimiters 32 from images from the camera 20 for at least a selected duration, 2. A steering angle from the steering angle sensor 28 being less than a threshold angle for at least a selected duration, 3. A rate of change of steering angle from the steering angle sensor 28 being less than a threshold rate of change of angle for at least a selected duration, and 4. A vehicle speed from the speed sensor 30 being greater than a threshold speed for at least a selected duration.

When updating the yaw rate offset 78, it will be noted that the potential for error in determining that the vehicle 10 should have an actual yaw rate of zero varies depending on the specifics of each situation. For example, there is relatively less potential for error in a determination that the vehicle 10 is stationary than there is in a determination that the vehicle 10 is driving straight when only one lane delimiter 32 is detected by the camera 20. Depending on the potential for error associated with a particular updating of the yaw rate, the proportions of the measured yaw rate and the previous yaw rate offset that are added together to form the new yaw rate offset 78 can be adjusted. More specifically, when there is a relatively high potential for error in the measured offset (such as, for example, when the measured yaw rate is obtained when the vehicle is determined to be driving straight but where the control system 18 could not identify any lane delimiters), the new yaw rate offset 78 may be generated from a relatively small proportion (such as, for example, about 1 percent) of the measured yaw rate added to a relatively large proportion (such as, for example, about 99 percent) of the previous yaw rate offset. By contrast, when there is relatively less potential for error (such as, for example, when the measured yaw rate was obtained when the vehicle 10 is determined to be stationary), the new yaw rate offset 78 may be determined to be a relatively higher proportion (such as, for example, about 10 percent) of the measured yaw rate can be added to a relatively reduced proportion (such as, for example, about 90 percent) of the previous yaw rate offset.

Accordingly, the yaw rate offset filter routine 76 can apply the following offset update formula:

$$W_{OFFSET} = K(0 - W_{BUFFER}) + (1-K) W_{OLD\ OFFSET}$$

where:

$W_{OFFSET}$ is the new yaw rate offset 78 being determined;

K is the proportion of the measured yaw rate used to determine the new yaw rate offset 78;

(1−K) is the proportion of the previous yaw rate offset used to determine the new yaw rate offset 78;

$W_{BUFFER}$ is the measured yaw rate (e.g. obtained using one of the routines 72, 74); and $W_{OLD\ OFFSET}$ is the previous yaw rate offset.

As can be seen, the proportion K defines a ratio by which the measured yaw rate obtained by one of the routines 72, 74 is combined with the stored yaw rate offset 78, the ratio being K/(1−K). For small values of K, the stored yaw rate offset 78 is thus less updated by the measured yaw rate obtained by one of the routines 72, 74. The proportion K can be considered to be a numerical expression of the level of confidence in the measured yaw rate obtained by one of the routines 72, 74 being an accurate value for the yaw rate offset 78. Combining the yaw rate obtained by one of the routines 72, 74 with the stored yaw rate offset 78 in such a way also serves as a time-based filter, so that error in the yaw rate obtained by one of the routines 72, 74 is mitigated and eventually eliminated by subsequent iterations. The proportion K may be set to zero to allow the stored yaw rate offset 78 to not be updated, or 1 to allow immediate and complete copy of the current yaw rate to the yaw rate offset 78. The yaw rate offset filter routine 76 may be understood to implement a low-pass filter, where the filter constant is the proportion K.

In this exemplary embodiment, the proportion K ranges from 0.01 to 0.10, giving ratios of 1:99 and 1:9 for the measured yaw rate ($W_{BUFFER}$) obtained by one of the routines 72, 74 to the previous yaw rate offset 78 ($W_{OLD\ OFFSET}$). The proportion K may be about 0.10 when the vehicle stationary detection routine 72 obtains the yaw rate to reflect a relatively high confidence in the accuracy of $W_{BUFFER}$ in such a situation. Continuing with this exemplary embodiment, when the vehicle straight driving detection routine 74 obtains the yaw rate, the proportion K may be somewhere in the range of about 0.01 to 0.04 depending on such factors as the number of straight lane delimiters that are detected. It will be understood that these are merely example values. Higher values for the proportion K mean that the yaw rate offset 78 will more quickly change, while lower offset correction values mean that the yaw rate offset 78 will change more slowly. The proportion K will be discussed in more detail below with respect to FIG. 5.

Once the yaw rate offset filter routine 76 determines the new yaw rate offset 78, $W_{OFFSET}$, the new yaw rate offset is stored in the memory 64 and becomes the stored yaw rate offset 78.

The routines 72, 74, 76 may be repeated to continually update the yaw rate offset 78. Using the yaw rate offset 78, the control system 18 can correct for error in signals from the yaw rate sensor 22. In other words, using the yaw rate offset 78, the control system 18 can receive a measured yaw rate from the yaw rate sensor 22 (which may be referred to as a second measured yaw rate to distinguish it from the measured yaw rate taken in the routines 72, 74 used to update the offset 78) and can apply the known offset 78 to it to arrive at a corrected yaw rate 80. When the control system 18 needs to determine the yaw rate for the vehicle 10 (such as, for example, for use by the collision mitigation system or the stability control system) the processor 62 can obtain a corrected yaw rate 80 by combining a new measured yaw rate sensed at the yaw rate sensor 22 (the aforementioned second measured yaw rate), with the yaw rate offset 78, as may be expressed by the following corrected yaw rate formula:

$$W_{CORRECTED} = W_{INPUT} + W_{OFFSET}$$

where:

$W_{CORRECTED}$ is the corrected yaw rate 80 being determined;

$W_{INPUT}$ is the yaw rate obtained from the yaw rate sensor 22, and this may be a yaw rate stored in the buffer 82; and $W_{OFFSET}$ is the yaw rate offset 78.

The corrected yaw rate 80 may be stored in the memory 64 or output at the input/output interface 66, as needed.

Figure 5:
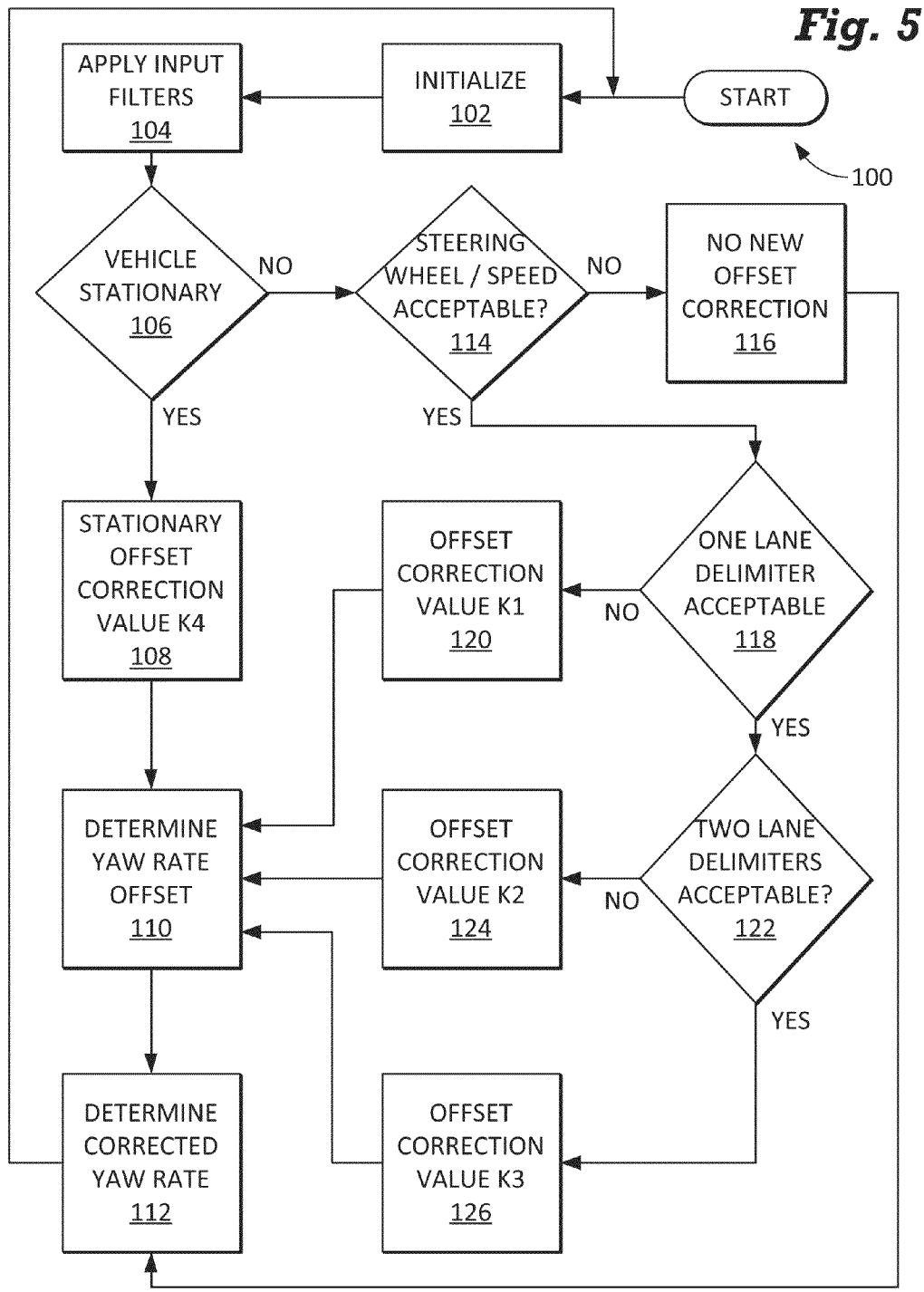
FIG. 5 is a flowchart of a method of determining a corrected yaw rate.

FIG. 5 illustrates a flowchart of a method 100 of correcting yaw rate. The method 100 may be embodied by the routines 72, 74, 76 discussed above, and the description for these routines may be referenced to better understand the method 100.

At step 102, the method is initialized. The buffer 82 may be cleared and then filled with raw yaw rate input from the yaw rate sensor 22.

At step 104, the input yaw rates from the sensor 22 may be filtered to reduce the effects of noise. Spurious values may be ignored. Any suitable filter may be used. Step 104 may be performed after the buffer 82 is filled or while the buffer 82 is being filled during step 102. The result of steps 102 and 104 is a filtered input yaw rate that will be used by the remainder of the method 100.

At step 106, it is determined whether the vehicle 10 is stationary for a sufficient duration, as described above. If it is determined at step 106 that the vehicle 10 is stationary, the value of the proportion K is set to be equal to K4 at step 108. K4 may, for example, be 0.1, which reflects a relatively high degree of confidence that the vehicle 10 is in fact stationary (and therefore has a true yaw rate of about zero).

At step 110, the yaw rate offset 78 is updated as described above, using the formulas described above. At step 112, the corrected yaw rate 80 is determined using the formula provided above.

When it is determined at step 106 that the vehicle is not stationary, step 114 is carried out. At step 114, it is determined whether the vehicle 10 is moving straight. To that end, one or more of the following conditions may be evaluated:

the steering angle meeting related criteria such as whether the steering angle is about +/−10 degrees of a zero steering angle for a selected period of time, and a vehicle speed meeting related criteria such as whether the vehicle speed is greater than a minimum acceptable speed (such as, for example, about 10 kph, or for example, about 60 kph) for a selected (optionally different) period of time;

the differential speeds of the wheels 12 on the right side of the vehicle vs. the left side of the vehicle being below a selected threshold differential speed;

data from an onboard GPS system meeting selected criteria that indicate that the vehicle is driving straight.

Step 114 is a coarse determination of whether the vehicle 10 is moving in a straight path. When it is determined that the vehicle 10 is not stationary at step 106 and is not moving in a straight path, it is determined that the yaw rate offset 78 is not to be updated at step 116 and as a result the yaw rate offset 78 is not updated, and the method 100 can proceed to step 112 to determine a corrected yaw rate 80 by referencing the previously obtained yaw rate offset 78.

If, on the other hand, at step 114 it is determined that the vehicle 10 is moving relatively straight, then the control system 18 analyzes images from the camera 20 to determine how many lane straight delimiters can be detected.

At steps 118 and 122, one or more images from the environment outside the vehicle 10 are captured by the camera 20 and the control system 18 performs image analysis to detect and evaluate lane delimiters in the images. This may be part of an ongoing lane-keeping process or may be a process that is only performed when yaw rate offset 78 is being determined by the method 100.

If at step 118 no lane delimiters are found to be acceptable (such as of sufficient quality and of sufficient straightness, optionally for a sufficient period of time), then the proportion K is set to be equal to offset correction value K1 at step 120 and the yaw rate offset 78 is updated accordingly. If at steps 118 and 122 one lane delimiter (32*a* or 32*b*) is found to be acceptable, but not two lane delimiters (32*a* and 32*b*), then the proportion K is set to be equal to offset correction value K2 at step 124 and the yaw rate offset 78 is updated accordingly. If at step 122 two lane delimiters are found to be acceptable, then the proportion K is set to be equal to offset correction value K3 at step 126 and the yaw rate offset 78 is updated accordingly. As noted above, K1 may be less than K2, which may be less than K3, which may be less than K4. Exemplary values for K1, K2 and K3 may comprise about 0.02, 0.03 and 0.04, respectively.

At step 118, if no acceptable lane delimiter is detected, or if one or more lane delimiters are detected, but did not remain detected for a sufficient period of time then step 120 is performed to select the offset correction value K1 corresponding to a first level of confidence that the vehicle 10 is moving straight based on the conditions met at step 114. If one acceptable lane delimiter (such as either the left lane delimiter 32*a* or the right lane delimiter 32*b* in FIG. 6) is detected for the first duration of time, then step 122 is performed to determine whether two acceptable lane delimiters (32*a* and 32*b*) are detected for a second duration of time.

The first and second durations may be of different lengths or the same length, and may be coincident times, partially overlapping times or separate times. Steps 118 and 122 may be performed at the same time by the same process, and are merely described as separate for clarity.

In relation to the above-described routines 72-76, the method 100 may be understood as follows. Steps 106 and 108 correspond to the vehicle stationary detection routine 72. Steps 114, 118, 120, 122, 124, and 126 correspond to the vehicle straight driving detection routine 74. Step 110 corresponds to the yaw rate offset filter routine 76.

When steps 102, 104, 106, 114, 116, and 112 are performed in that sequence, the vehicle 10 is not being operated in a manner conducive to updating the previously obtained yaw rate offset 78 and corrected yaw rates 80 are being determined using the previously obtained yaw rate offset.

The steps of the method 100 may be performed in orders different from that described. Any of the steps may be split into two or more smaller steps. Any two or more of the steps may be combined into a larger step. Steps may be omitted.

It will be understood that the use of variable values for the proportion K may be advantageous regardless of the specific details of the routines that are used to determine the new yaw rate offset 78. In other words it is contemplated to be advantageous to assign different values for the proportion K based on a set of different situations determined to be conducive for updating the value of the yaw rate offset 78, wherein the different situations have different levels of confidence associated therewith.

The techniques described herein may be repeated while the vehicle 10 is being operated in order to continually determine whether conditions are suitable for updating the yaw rate offset 78. Such repetition can occur according to a period, such as 10 ms, 50 ms, or 100 ms, and such period may be allowed to vary, such as by about +/−50 percent or thereabouts.

Thus, the present invention may comprise a system for determining a corrected yaw rate of a land-based vehicle, with the system comprising a yaw rate sensor, a camera and a processor. The camera is configured to be mounted to the vehicle and operable to capture image data representative of the environment exterior of the vehicle. The processor is operable to:

(a) process image data captured by the camera;

(b) determine if the vehicle is moving and has a zero yaw rate at least based on processing of captured image data;

(c) obtain a first measured yaw rate from the yaw rate sensor when the vehicle is determined in step (b) to be moving and to have a zero yaw rate;

(d) determine a yaw rate offset based at least in part on the measured yaw rate obtained in step (c);

(e) obtain a second measured yaw rate from the yaw rate sensor; and (f) determine a corrected yaw rate for the vehicle based on the second measured yaw rate and the yaw rate offset.

Optionally, the processor may be operable in step (b) to (g) determine at least from processing of captured image data that the vehicle is driving straight. The processor may be operable in step (b) to:

(h) detect any lane delimiters present in the exterior scene represented by captured image data;

(i) determine whether any lane delimiters detected in step (h) are qualifying lane delimiters which meet selected criteria; and (j) compare a heading of the vehicle with the direction of at least one qualifying lane delimiter.

Optionally, when there are two qualifying lane delimiters, the processor may be operable in step (j) to compare a heading of the vehicle with the direction of the two qualifying lane delimiters. Optionally, the processor may be operable in step (i) to determine whether the amount of curvature in any lane delimiters detected in step (h) is below a selected threshold amount of curvature. Optionally, the processor may be operable in step (i) to determine whether any lane delimiters detected in step (h) have been detected for more than a selected duration.

Optionally, the yaw rate offset may be a first selected proportion of the first measured yaw rate obtained in step (c) and a second selected proportion of a previous yaw rate offset, and wherein the first and second selected proportions are selected based at least in part on how many lane delimiters meet the selected criteria.

Optionally, the processor may be operable in step (b) to determine whether a steering angle of the vehicle is less than a selected threshold steering angle. Optionally, the processor may be operable in step (b) to determine whether the speed of the vehicle is greater than a selected threshold speed. Optionally, the processor may be operable in step (b) to determine whether the steering angle of the vehicle is approximately zero.

Optionally, the yaw rate offset may be a first selected proportion of the first measured yaw rate obtained in step (c) and a second selected proportion of a previous yaw rate offset.

According to another aspect of the present invention, a system for determining a corrected yaw rate for a yaw rate sensor on a land-based vehicle comprises an accelerometer operable to sense a longitudinal acceleration of the vehicle and a processor connected to the yaw rate sensor and the accelerometer, with the processor operable to:

(a) obtain an acceleration from an accelerometer positioned to sense a longitudinal acceleration of the vehicle;

(b) determine a rate of change of the acceleration;

(c) carry out a determination of a yaw rate offset based at least in part on a first measured yaw rate from the yaw rate sensor, at least in part depending on whether the rate of change of the acceleration determined in step (b) is approximately zero;

(d) obtain a second measured yaw rate from the yaw rate sensor; and (e) determine a corrected yaw rate for the vehicle based on the second measured yaw rate and the yaw rate offset.

The processor may be operable to carry out step (c) depending at least in part on whether the rate of change of the acceleration determined in step (b) is approximately zero for a selected duration. The processor may be operable to carry out step (c) depending in part on a determination of whether the vehicle has a speed that is approximately zero.

Optionally, the yaw rate offset is a first selected proportion of the measured yaw rate obtained in step (c) and a second selected proportion of a previous yaw rate offset.

According to another aspect of the present invention, a system for determining a corrected yaw rate for a yaw rate sensor on a land-based vehicle comprises a memory and a processor connected to the yaw rate sensor and the memory, with the processor operable to:

(a) determine whether the vehicle has a yaw rate of zero;

(b) obtain a first measured yaw rate from the yaw rate sensor depending on the determination made in step (a);

(c) determine a yaw rate offset that is a first selected proportion of the first measured yaw rate obtained in step (b) and a second selected proportion of a previous yaw rate offset, wherein the first selected proportion and the second selected proportion are selected based on a set of criteria based on data determined from the at least one other sensor;

(d) obtain a second measured yaw rate from the yaw rate sensor; and (e) determine a corrected yaw rate for the vehicle based on the second measured yaw rate and the yaw rate offset.

The data may include a derivative of longitudinal acceleration for the vehicle and wherein the set of criteria includes whether the derivative of the longitudinal acceleration for the vehicle is approximately zero. The ratio of the first and second selected proportions may vary between about 1:99 and about 1:9. The at least one sensor may include a vehicle-mounted camera and the data may include image data captured by the vehicle-mounted camera and representative of the environment exterior of the vehicle. The set of criteria may include the number of lane delimiters detected in the image data.

Optionally, and desirably, the system of the present invention utilizes an image-based sensor or camera and image processing of image data captured by the camera. The system and/or camera of the vehicle includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066571, filed Nov. 27, 2012, which is hereby incorporated herein by reference in its entirety.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least about 640 columns and 480 rows (at least about a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and/or PCT Application No. PCT/US2012/048110, filed Jul. 25, 2012, and/or PCT Application No. PCT/CA2012/000378, filed Apr. 25, 2012, and/or PCT Application No. PCT/US2012/056014, filed Sep. 19, 2012, and/or PCT Application No. PCT/US12/57007, filed Sep. 25, 2012, and/or PCT Application No. PCT/US2012/061548, filed Oct. 24, 2012, and/or PCT Application No. PCT/US2012/062906, filed Nov. 1, 2012, and/or PCT Application No. PCT/US2012/063520, filed Nov. 5, 2012, and/or PCT Application No. PCT/US2012/064980, filed Nov. 14, 2012, and/or PCT Application No. PCT/US2012/066570, filed Nov. 27, 2012, and/or PCT Application No. PCT/US2012/066571, filed Nov. 27, 2012, and/or PCT Application No. PCT/US2012/068331, filed Dec. 7, 2012, and/or PCT Application No. PCT/US2012/071219, filed Dec. 21, 2012, and/or PCT Application No. PCT/US2013/022119, filed Jan. 18, 2013, and/or PCT Application No. PCT/US2013/027342, filed Feb. 22, 2013, and/or U.S. patent application Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/676,405, filed Jul. 27, 2012; Ser. No. 61/666,146, filed Jun. 29, 2012; Ser. No. 61/648,744, filed May 18, 2012; Ser. No. 61/624,507, filed Apr. 16, 2012; Ser. No. 61/616,126, filed Mar. 27, 2012; Ser. No. 61/613,651, filed Mar. 21, 2012; and/or Ser. No. 61/607,229, filed Mar. 6, 2012, which are all hereby incorporated herein by reference in their entireties. The system may communicate with other communication systems via any suitable means, such as by utilizing aspects of the systems described in PCT Application No. PCT/US10/038,477, filed Jun. 14, 2010, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and/or PCT Application No. PCT/US2012/066571, filed Nov. 27, 2012, and/or PCT Application No. PCT/US2012/068331, filed Dec. 7, 2012, and/or PCT Application No. PCT/US2013/022119, filed Jan. 18, 2013, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the foregoing provides certain non-limiting example embodiments, it should be understood that combinations, subsets, and variations of the foregoing are contemplated. The monopoly sought is defined by the claims.

What is claimed is:

1. A vision system for a vehicle, said vision system comprising:

a camera comprising a lens and a CMOS photosensor array;

said photosensor array comprising a plurality of photosensor elements arranged in a matrix that comprises multiple columns of photosensor elements and multiple rows of photosensor elements;

wherein said camera is disposed at or proximate to an in-cabin portion of a windshield of a vehicle equipped with said vision system;

wherein said camera has a forward field of view to the exterior of the equipped vehicle through the windshield of the equipped vehicle;

wherein said camera is operable to capture image data;

a control comprising an image processor;

wherein said image processor is operable to process captured image data to determine lane delimiters present in the field of view of said camera;

said control connecting to a vehicle communication bus of the equipped vehicle;

said control receiving vehicle data via said vehicle communication bus;

wherein said vehicle data is provided by at least one of (i) an accelerometer of the equipped vehicle, (ii) a transmission sensor of the equipped vehicle, (iii) a steering angle sensor of the equipped vehicle, (iv) a speed sensor of the equipped vehicle and (v) a brake sensor of the equipped vehicle;

wherein, responsive at least in part to processing of captured image data by said image processor and to vehicle data received via said vehicle communication bus, said control determines a yaw rate; and wherein said control provides the determined yaw rate to a driver assistance system of the equipped vehicle.

2. The vehicular vision system of claim 1, wherein said driver assistance system comprises at least one of (i) a collision avoidance system, (ii) a collision mitigation system and (iii) a stability control system.

3. The vehicular vision system of claim 1, wherein said camera is part of at least one of (i) a lane departure warning system of the equipped vehicle, (ii) a lane keeping system of the equipped vehicle, (iii) a vehicle detection system of the equipped vehicle, (iv) an object detection system of the equipped vehicle, (v) a traffic sign recognition system of the equipped vehicle, (vi) a distance measurement system of the equipped vehicle and (vii) a headlamp control system of the equipped vehicle.

4. The vehicular vision system of claim 1, wherein, responsive at least in part to processing of captured image data by said image processor, the heading of the equipped vehicle is determined.

5. The vehicular vision system of claim 1, wherein the number of rows of photosensor elements of said photosensor array is less than the number of columns.

6. The vehicular vision system of claim 5, wherein the number of rows of photosensor elements of said photosensor array is at least about 480 rows and wherein the number of columns of photosensor elements of said photosensor array is at least about 640 columns.

7. The vehicular vision system of claim 1, wherein said control determines the yaw rate responsive to processing of captured image data by said image processor determining lane delimiters which meet at least one selected criterion.

8. The vehicular vision system of claim 7, wherein said at least one selected criterion comprises that the lane delimiters are straight.

9. The vehicular vision system of claim 1, wherein said system, responsive at least in part to processing of captured image data by said image processor, detects colored lane markers present in the field of view of said camera.

10. The vehicular vision system of claim 1, wherein said vehicle communication bus comprises a controller-area network.

11. The vehicular vision system of claim 1, wherein said vehicle communication bus comprises a local interconnect network.

12. The vehicular vision system of claim 1, wherein said image processor comprises one of (i) an EyeQ2 image processing chip and (ii) an EyeQ3 image processing chip.

13. The vehicular vision system of claim 1, wherein said control provides the determined yaw rate to said driver assistance system of the equipped vehicle via said vehicle communication bus.

14. A vision system for a vehicle, said vision system comprising:

a camera comprising a lens and a CMOS photosensor array;

said photosensor array comprising a plurality of photosensor elements arranged in a matrix that comprises multiple columns of photosensor elements and multiple rows of photosensor elements;

wherein said camera is disposed at or proximate to an in-cabin portion of a windshield of a vehicle equipped with said vision system;

wherein said camera has a forward field of view to the exterior of the equipped vehicle through the windshield of the equipped vehicle;

wherein said camera is operable to capture image data;

a control comprising an image processor;

wherein said image processor is operable to process captured image data to determine lane delimiters present in the field of view of said camera;

said control connecting to a vehicle communication bus of the equipped vehicle;

said control receiving vehicle data via said vehicle communication bus;

wherein, responsive at least in part to processing of captured image data by said image processor and to vehicle data received via said vehicle communication bus, said control determines a yaw rate;

wherein said control provides the determined yaw rate to a driver assistance system of the equipped vehicle; and wherein said camera is part of at least one of (i) a lane departure warning system of the equipped vehicle, (ii) a lane keeping system of the equipped vehicle, (iii) a vehicle detection system of the equipped vehicle, (iv) an object detection system of the equipped vehicle, (v) a traffic sign recognition system of the equipped vehicle, (vi) a distance measurement system of the equipped vehicle and (vii) a headlamp control system of the equipped vehicle.

15. The vehicular vision system of claim 14, wherein the number of rows of photosensor elements of said photosensor array is less than the number of columns, and wherein said driver assistance system comprises at least one of (i) a collision avoidance system, (ii) a collision mitigation system and (iii) a stability control system.

16. The vehicular vision system of claim 15, wherein said vehicle data is provided by at least one of (i) an accelerometer of the equipped vehicle, (ii) a transmission sensor of the equipped vehicle, (iii) a steering angle sensor of the equipped vehicle, (iv) a speed sensor of the equipped vehicle and (v) a brake sensor of the equipped vehicle.

17. The vehicular vision system of claim 16, wherein said vehicle communication bus comprises a controller-area network.

18. A vision system for a vehicle, said vision system comprising:

a camera comprising a lens and a CMOS photosensor array;

said photosensor array comprising a plurality of photosensor elements arranged in a matrix that comprises multiple columns of photosensor elements and multiple rows of photosensor elements;

wherein the number of rows of photosensor elements of said photosensor array is less than the number of columns;

wherein said camera is disposed at or proximate to an in-cabin portion of a windshield of a vehicle equipped with said vision system;

wherein said camera has a forward field of view to the exterior of the equipped vehicle through the windshield of the equipped vehicle;

wherein said camera is operable to capture image data;

a control comprising an image processor;

wherein said image processor is operable to process captured image data to determine lane delimiters present in the field of view of said camera;

said control connecting to a vehicle communication bus of the equipped vehicle;

said control receiving vehicle data via said vehicle communication bus;

wherein said vehicle data is provided by at least one of (i) an accelerometer of the equipped vehicle, (ii) a transmission sensor of the equipped vehicle, (iii) a steering angle sensor of the equipped vehicle, (iv) a speed sensor of the equipped vehicle and (v) a brake sensor of the equipped vehicle;

wherein, responsive at least in part to processing of captured image data by said image processor and to vehicle data received via said vehicle communication bus, said control determines a yaw rate;

wherein said control provides the determined yaw rate to a driver assistance system of the equipped vehicle;

wherein said driver system comprises at least one of (i) a collision avoidance system, (ii) a collision mitigation system and (iii) a stability control system; and wherein said camera is part of a lane departure warning system of the equipped vehicle.

19. The vehicular vision system of claim 18, wherein said camera is part of at least one of (i) a lane keeping system of the equipped vehicle, (ii) a vehicle detection system of the equipped vehicle, (iii) an object detection system of the equipped vehicle, (iv) a traffic sign recognition system of the equipped vehicle, (v) a distance measurement system of the equipped vehicle and (vi) a headlamp control system of the equipped vehicle.

20. The vehicular vision system of claim 19, wherein said vehicle communication bus comprises a controller-area network.

* * * * *

UNITED STATES PATENT AND TRADEMARK OFFICE
CERTIFICATE OF CORRECTION

| | | |
|---|---|---|
| PATENT NO. | : 8,849,495 B2 | Page 1 of 1 |
| APPLICATION NO. | : 14/246495 | |
| DATED | : September 30, 2014 | |
| INVENTOR(S) | : William J. Chundrlik, Jr. et al. | |

It is certified that error appears in the above-identified patent and that said Letters Patent is hereby corrected as shown below:

On the Title Page

Item (72) Inventors: "William J. Chundik, Jr." should be --William J. Chundrlik, Jr.--

In the Specification

Column 8
Line 64, "offset" should be --offset 78.--

Column 19
Line 33, "PCT/US10/038,477" should be --PCT/US10/038477--

Signed and Sealed this
Seventh Day of July, 2015

Michelle K. Lee
*Director of the United States Patent and Trademark Office*